United States Patent
Pugh et al.

(10) Patent No.: US 7,530,053 B2
(45) Date of Patent: *May 5, 2009

(54) METHODS UTILIZING A DEBUGGING PROXY

(75) Inventors: William A. Pugh, Seattle, WA (US);
Joshua Moll Eckels, Seattle, WA (US);
Terry Leonard Lucas, Mill Creek, WA (US)

(73) Assignee: Bea Systems, Inc., San Jose, CA (US)

( * ) Notice: Subject to any disclaimer, the term of this patent is extended or adjusted under 35 U.S.C. 154(b) by 687 days.

This patent is subject to a terminal disclaimer.

(21) Appl. No.: 10/787,702

(22) Filed: Feb. 26, 2004

(65) Prior Publication Data

US 2005/0010678 A1    Jan. 13, 2005

Related U.S. Application Data

(60) Provisional application No. 60/450,383, filed on Feb. 27, 2003.

(51) Int. Cl.
*G06F 9/44* (2006.01)
(52) U.S. Cl. .................. 717/124; 709/229; 710/124; 370/232; 370/463; 345/555
(58) Field of Classification Search .................. 717/124
See application file for complete search history.

(56) References Cited

U.S. PATENT DOCUMENTS

| | | | | |
|---|---|---|---|---|
| 4,373,183 | A | * | 2/1983 | Means et al. ................. 710/124 |
| 5,179,651 | A | * | 1/1993 | Taaffe et al. ................. 345/555 |
| 5,381,413 | A | * | 1/1995 | Tobagi et al. ................ 370/448 |
| 5,805,892 | A | | 9/1998 | Nakajima |
| 5,828,835 | A | | 10/1998 | Isfeld |
| 6,637,024 | B1 | * | 10/2003 | Johnson et al. .............. 717/124 |
| 6,640,238 | B1 | | 10/2003 | Bowman-Amuah |
| 2003/0058277 | A1 | | 3/2003 | Bowman-Amuah |
| 2003/0115366 | A1 | | 6/2003 | Robinson |
| 2003/0140149 | A1 | * | 7/2003 | Marejka et al. ............. 709/229 |

OTHER PUBLICATIONS

2002 Sun Microsystems, Inc. "Java Debug Wire Protocol".*

* cited by examiner

*Primary Examiner*—Wei Y Zhen
*Assistant Examiner*—Phillip H Nguyen
(74) *Attorney, Agent, or Firm*—Womble Carlyle Sandridge & Rice PLLC

(57) ABSTRACT

A debugging proxy can be used to manage communication between a client and a debugger or debugging component. A debugging protocol can be used by the debugging proxy to facilitate communication management. A debugging protocol can provide for asynchronous messaging, and can allow for the communication of large grain messages. A debugging protocol can also implement a priority scheme that can be used to process messages between a client and a debugger based upon a priority assigned to each message.

30 Claims, 2 Drawing Sheets

METHODS UTILIZING A DEBUGGING PROXY

CLAIM TO PRIORITY

The present application claims the benefit of priority under 35 U.S.C. §119(e) to U.S. Provisional Patent Application entitled "SYSTEMS AND METHODS UTILIZING A DEBUGGING PROXY", Application No. 60/450,383, filed on Feb. 27, 2003, which application is incorporated herein by reference.

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

FIELD OF THE INVENTION

The present invention relates to the debugging and/or editing of software code.

BACKGROUND

Remote debugging systems are becoming evermore important for the growing Web application and Web services industry. These systems allow a developer to monitor, inspect, and control the execution of software running on a remote server. This is especially critical for diagnosing problems that show up after deploying the software, but cannot be reproduced in the local development environment.

Unfortunately, most remote debugging protocols (e.g., the Java™ Debugging Interface (JDI)) are inefficient and resource intensive. These protocols are implemented by sending a constant stream of fine-grained information about debugging requests, state information, and events. This results in a slow and unproductive experience for developers and requires more effective communications bandwidth than is otherwise necessary. Bandwidth utilization problems are exacerbated by the fact that fine grain debugging messages may use only a small portion of the fixed size network packets used to transmit them, increasing communications overhead by transmitting many packets that are largely empty.

To make matters worse, debugging protocols are designed to be synchronous, meaning a debugging client must stop and wait for the results from each request it sends before the client can send another request or continue processing. This "blocking and waiting" behavior often means the end user cannot enter their next command until the remote debugging system responds. Consequently, the user interface becomes sluggish and frustrating for the developer. This is true for both local and remote debugging.

Often, the user isn't even interested in the result returned by the debugger, which immediately gets thrown away when the user enters their next command. For example, users often want to step rapidly through each line of the code to see which instructions are executed under certain conditions. With a synchronous debugging protocol, the user must wait after each step command for the debugger to return information about the new line. However, that information is discarded without being examined as soon as the user enters the next step command.

These problems are more pronounced when the debugging client is a visual Integrated Development Environment (IDE). This IDE will usually generate many requests for debugging information automatically on behalf of the user, based on assumptions about the information the developer will "likely" want to inspect. Thus, when the IDE's assumptions are correct, the IDE can answer the user's most "likely" questions quickly from results cached in memory.

Unfortunately, this eager method for collecting debugging information does not come without a cost, but results in more requests being sent to the debugger and ultimately more waiting for more results that never get used. Some IDEs attempt to reduce the amount of information they request. However, when the user requests a piece of information the IDE did not anticipate, the user must wait longer for the IDE to request that information from the debugger. At a minimum, the IDE may request debugging information about running application state that is immediately visible to the programmer in the IDE. For example, FIG. 1 illustrates an IDE with the current local variables and current call stack visible. In this case, the IDE may request only information about each variable displayed in the local variables window and each frame of the call stack shown in the call stack window. However, if the user is just stepping through the executed instructions rapidly, she may never even look at these windows. Therefore, the information collected at each step is never actually used and the time and resources spent collecting this information is wasted.

BRIEF SUMMARY

Methods in accordance with embodiments of the present inventions can improve upon existing debugging approaches by utilizing a debugging proxy. A debugging proxy can be used to manage communication between a client and a debugger or debugging component. A debugging protocol can be used by the debugging proxy to facilitate communication management. A debugging protocol can provide for asynchronous messaging, and can allow for the communication of large grain messages. A debugging protocol can also implement a priority scheme that can be used to process messages between a client and a debugger based upon a priority assigned to each message.

Other features, aspects, and objects of the invention can be obtained from a review of the specification, the figures, and the claims.

DETAILED DESCRIPTION

Figure 1:
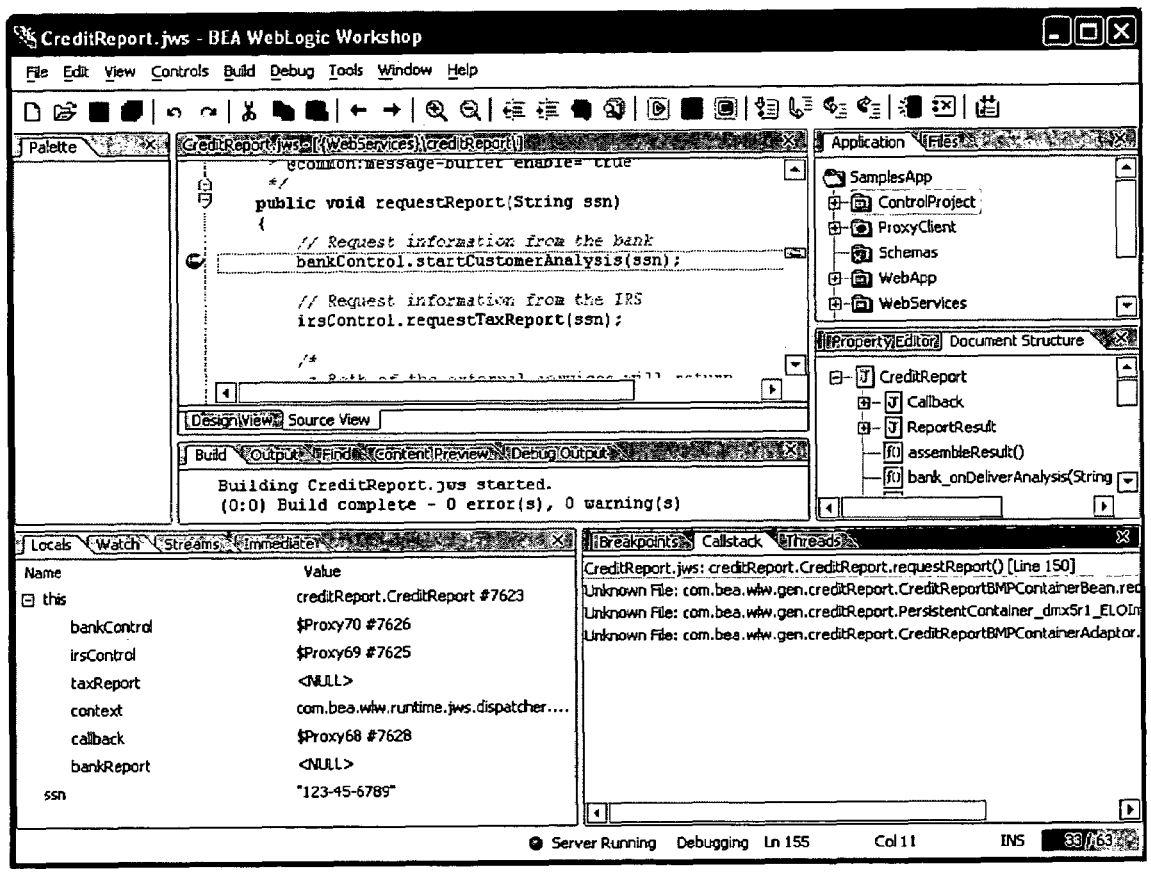
FIG. 1 is an illustration of an IDE system in accordance with the prior art.

Methods in accordance with embodiments of the present invention overcome problems with existing debugging approaches by utilizing an efficient, responsive debugging proxy. The debugging proxy manages communication between the client and the debugger. Communication with the debugger is handled using the debugger's native interfaces (e.g., JDI) allowing the debugger to be used in any context where a standard debugger exists. The proxy may be located on the same machine or even in the same process as the debugger ensuring potentially inefficient communications are completed locally without requiring network resources.

Communication with a client can be handled using a new asynchronous debugging protocol that uses large grain messages. Such a protocol can also implement a priority scheme for ensuring high priority requests get answered quickly, and allowing lower priority requests to get automatically overridden (i.e., canceled) if the associated results are no longer needed by the client.

A large grain, asynchronous debugging protocol can be used to manage communication between the client and the debugging proxy. Instead of sending a constant stream of fine-grained debugging messages, a client can send larger debugging messages, and can send them less frequently than would otherwise be necessary. This can result in lower overall communication requirements and more efficient use of available bandwidth. Consequently, the results of debugging requests can be available to the client faster, especially for remote debugging sessions.

In addition, communications between a client and a debugging proxy can be asynchronous. Therefore, the client need not block and wait for the results of each debugging result it sends. Instead, a client can send a request and return control to the user, allowing the user to continue interacting with the client and sending commands. Therefore, the client can send several commands (e.g., step) without waiting for the results from the previous command to be returned and displayed. Results can be returned to the client asynchronously, allowing the client to update its display with the new information as that information becomes available, without disrupting the responsiveness of the debugging client to the user.

In addition to implementing a coarse grained and asynchronous protocol, a debugging proxy can implement a priority scheme that allows faster processing of higher priority commands. Thus, commands most likely to require a fast response to the user can bypass commands that don't require as fast a response.

Some higher priority debugging requests can also override, or effectively cancel, lower priority requests if there is no longer any need to complete them. For example, when a user steps into a new function, a debugging client may send a "step into" request followed by several lower priority requests, to get the values of variables in the new function scope. If the user immediately steps into another function before the values of variables are returned, the requests for those variables can be cancelled. The variables requested during the first step operation may no longer be visible in the new function scope after the second step operation. Therefore it can be safe to cancel the request instead of waiting for and ultimately discarding the results.

Architecture

Figure 2:
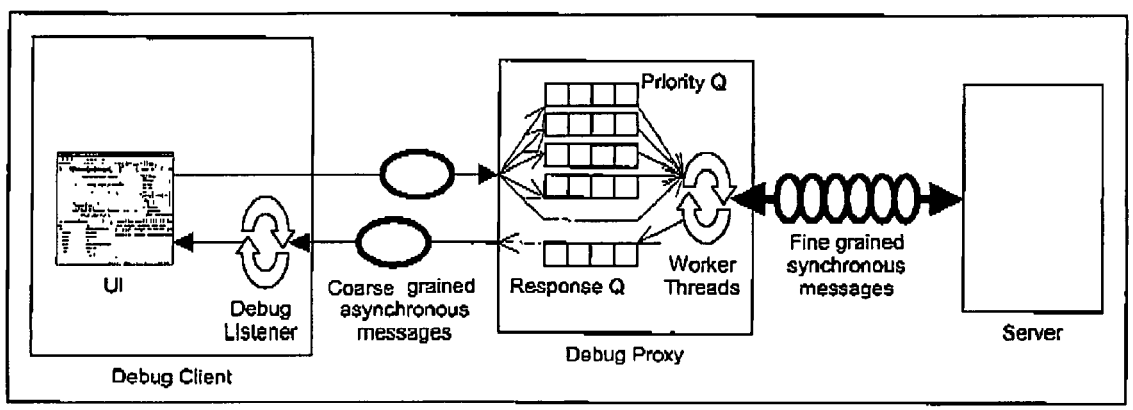
FIG. 2 is an illustration of a debug proxy architecture in accordance with one embodiment of the present invention.

FIG. 2 depicts a system in accordance with one embodiment of the present invention. In this embodiment, the client generates requests to the debug proxy in response to the user's interaction with the user interface. Debug requests are sent from the client to the proxy using a coarse grained debugging protocol. The debugging proxy examines each message, determines its priority and places it on a priority queue or, for an immediate priority message, sends it directly to a worker thread. If the message is an override message, the debug proxy removes all pending requests from the priority queue that have a lower priority than the override message.

In one embodiment, when the worker threads are not processing immediate priority requests, they dequeue and processes requests from the priority queue starting with the highest priority items first and working through the remaining items in reverse priority order (i.e., highest to lowest priority). For each coarse grained request, the proxy object creates a new worker thread, which generates the corresponding series of fine grained requests to the server conforming to the server's standard (but less efficient) debugging protocol and waits for the corresponding results. The debug proxy may create a separate worker thread for each coarse grained request so it can continue processing additional requests without waiting for results from previous requests.

The debugging proxy may be located on the same machine as the server or even in the same process as the debugger on the server. Therefore, potentially inefficient communications governed by the server's standard debugging protocol may execute locally without requiring unnecessary communication overhead or consuming network resources.

When a worker thread has all the required responses back from the server, it will aggregate the results into a single coarse grained message and place it in the response queue. The debugging proxy removes items from the response queue in order and sends them asynchronously to the client.

The debug listener in the client listens for asynchronous results from the server and notifies the UI as it receives them. The UI may then update its display based on the new information.

Some debugging requests sent to the server may result in one or more asynchronous response messages (a.k.a. events). For example, after the server receives a "set breakpoint" request it may generate an asynchronous response every time that breakpoint is encountered while running the code. The worker threads listen for asynchronous events from the server, package them into coarse grained messages and send them to the client in much the same way synchronous messages from the server are processed.

Debugging Protocol

In one embodiment, the coarse grained, asynchronous debugging protocol consists of a series of request and response messages. In one embodiment, the messages implemented by serialized Java™ objects. Each of these objects contains the information needed to represent the associate request or response. Standard Java™ serialization rules are used to transmit the Java™ object over the wire. Using serialized Java™ objects makes it easy to add new message types to the protocol relatively quickly without having to define new wire formats for each message.

Debugging Message Base Class

In one embodiment, each Java™ object representing a particular message is derived from a common base class. Therefore, each message shares some common behavior and may inherit default behavior from the base class. One such common base class is described below.

```
public abstract class weblogic.debugging.packet.DebugPacket
implements
    java.io.Serializable
Base class for all debugger communication packets.
Constructors      public DebugPacket( )
Methods           public int getPriority( )
                      Subclasses should override to specify a different
                      priority
                  Returns
                      Default priority for all DebugPackets,
                      MEDIUM_PRIORITY
                  public boolean overridesLowerPriorityPackets( )
                      Subclasses should override this method if they
                      override lower priority packets that may be
                      queued for sending.
                  Returns
                      Default - false
```

-continued

| Fields | public static final IMMEDIATE_PRIORITY<br>public static final HIGH_PRIORITY<br>public static final MEDIUM_PRIORITY<br>public static final LOW_PRIORITY |
|---|---|

Debugging Message Summary

The following is a list of messages included in the debugging protocol in one embodiment. In one embodiment, each message includes a name, a priority (listed under "Pri"), a yes or no value indicating whether this message overrides lower priority messages previously sent (listed under "Ov") and optional comments.

| Debugging Messages | Pri | Ov | Comments |
|---|---|---|---|
| BreakpointHitPacket | High | Yes | Sent from proxy to IDE to tell it the VM being debugged hit a breakpoint. |
| ClearAllBreakpointsRequestPacket | Immediate | No | Sent from the IDE to the proxy to remove all currently set breakpoints |
| ClearAllBreakpointsResponsePacket | Immediate | No | |
| ClearBreakpointRequestPacket | Immediate | No | Sent from IDE to proxy to ask to remove an already set breakpoint |
| ClearBreakpointResponsePacket | Immediate | No | |
| ClearMethodBreakpointPacket | Medium | No | Sent from the IDE to the proxy to tell it to remove a method breakpoint |
| DisconnectReconnectPacket | High | No | |
| DisconnectRequestPacket | Immediate | Yes | |
| DisconnectResponsePacket | High | No | |
| DoneStartSetupPacket | High | No | |
| DoneStopSetupPacket | High | No | |
| ExceptionPacket | Medium | No | |
| ExitPacket | Medium | No | |
| GetBreakpointsRequestPacket | Medium | No | |
| GetBreakpointsResponsePacket | Medium | No | |
| GetFieldsRequestPacket | Medium | No | |
| GetFieldsResponsePacket | Medium | No | |
| GetStackFramesRequestPacket | Medium | No | |
| GetStackFramesResponsePacket | Medium | No | |
| GetThreadsRequestPacket | Medium | No | |
| GetThreadsResponsePacket | Medium | No | |
| GetValueRequestPacket | Medium | No | |
| GetValueResponsePacket | Medium | No | |
| GetVisibleVariablesRequestPacket | Medium | No | |
| GetVisibleVariablesResponsePacket | Medium | No | |
| GoRequestPacket | High | Yes | |
| GoResponsePacket | High | Yes | |
| InitPacket | High | Yes | |
| PausePacket | Immediate | No | |
| ProcessDonePacket | Low | No | |
| SetBreakpointRequestPacket | Immediate | No | Sent from IDE to proxy to tell it to set a breakpoint |
| SetBreakpointResponsePacket | Immediate | No | Sent from the proxy in response to a SetBreakPointRequestPacket from the IDE. |
| SetConditionalBreakpointRequestPacket | Immediate | No | Request to set a conditional breakpoint, sent from IDE to proxy. |
| SetExceptionBreakpointRequestPacket | Immediate | No | |
| SetMethodBreakpointRequestPacket | Medium | No | Sent from IDE to proxy to request a breakpoint be set on a method |
| SetMethodBreakpointResponsePacket | Medium | No | Sent from the proxy to the IDE in response to a SetMethodBreakpointRequestPacket |
| SetPropertiesRequestPacket | Immediate | No | |
| SetPropertiesResponsePacket | Immediate | No | |
| SetSmartDebuggingRequestPacket | High | No | |
| SetSmartDebuggingResponsePacket | High | No | |
| SetupPacket | Medium | No | |
| SetValueRequestPacket | Medium | No | |
| SetValueResponsePacket | Medium | No | |
| StepInPacket | High | Yes | |
| StepOutPacket | High | Yes | |
| StepOverPacket | High | Yes | |

Debugging Message Details

This section provides a detailed description of Java™ classes that could be used to define each of the messages above in one embodiment. Information available in each message is reflected by the fields and methods defined on each class (and its super classes) for accessing that information.

```
public class weblogic.debugging.packet.ValueResponse implements
    java.io.Serializable
Constructors            public ValueResponse(
                            String variable,
                            String value,
                            String valueType,
                            boolean complex,
                            boolean editable)
                        public ValueResponse(
                            String variable,
                            String value,
                            String valueType,
                            boolean complex,
                            boolean editable,
                            int arrayLength)
Methods                 public void setInterfaces(
                            Value val)
Fields                  public _variable
                        public _value
                        public _valueType
                        public _complex
                        public _editable
                        public _static
                        public _synthetic
                        public _arrayLength
                        public _interfaces
    public  class       weblogic.debugging.packet.StepOverPacket
        extends
        weblogic.debugging.packet.DebugPacket
Constructors            public StepOverPacket(
                            long threadId)
Methods                 public long getThreadId( )
                        public int getPriority( )
                        public boolean overridesLowerPriorityPackets( )
    public class weblogic.debugging.packet.StepOutPacket extends
        weblogic.debugging.packet.DebugPacket
Constructors            public StepOutPacket(
                            long threadId)
Methods                 public long getThreadId( )
                        public int getPriority( )
                        public boolean overridesLowerPriorityPackets( )
    public class weblogic.debugging.packet.StepInPacket extends
        weblogic.debugging.packet.DebugPacket
Constructors            public StepInPacket(
                            long threadId)
Methods                 public long getThreadId( )
                        public int getPriority( )
                        public boolean overridesLowerPriorityPackets( )
    public class weblogic.debugging.packet.SetValueResponsePacket extends
        weblogic.debugging.packet.DebugPacket
Constructors            public SetValueResponsePacket(
                            String variable,
                            boolean success,
                            String currentValue)
Methods                 public java.lang.String getVariable( )
                        public boolean wasSuccessful( )
                        public java.lang.String getCurrentValue( )
    public class weblogic.debugging.packet.SetValueRequestPacket extends
        weblogic.debugging.packet.DebugPacket
Constructors            public SetValueRequestPacket(
                            int frame,
                            long threadId,
                            String variable,
                            String newValue)
Methods                 public int getFrame( )
                        public long getThreadId( )
                        public java.lang.String getVariable( )
                        public java.lang.String getNewValue( )
    public class weblogic.debugging.packet.SetupPacket extends
        weblogic.debugging.packet.DebugPacket
Constructors            public SetupPacket( )
    public class weblogic.debugging.packet.SetSmartDebuggingResponsePacket
        extends weblogic.debugging.packet.DebugPacket
```

| | -continued |
|---|---|
| Constructors | public SetSmartDebuggingResponsePacket(<br>    boolean enabled) |
| Methods | public boolean isEnabled( )<br>public int getPriority( ) |
| public class weblogic.debugging.packet.SetSmartDebuggingRequestPacket<br>extends weblogic.debugging.packet.DebugPacket | |
| Constructors | public SetSmartDebuggingRequestPacket(<br>    boolean enabled) |
| Methods | public boolean isEnabled( )<br>public int getPriority( ) |
| public class weblogic.debugging.packet.SetPropertiesResponsePacket<br>extends weblogic.debugging.packet.DebugPacket | |
| Constructors | public SetPropertiesResponsePacket(<br>    String name,<br>    String value) |
| Methods | public java.lang.String getName( )<br>public java.lang.String getValue( )<br>public int getPriority( ) |
| public class weblogic.debugging.packet.SetPropertiesRequestPacket<br>extends weblogic.debugging.packet.DebugPacket | |
| Constructors | public SetPropertiesRequestPacket(<br>    String name,<br>    String value) |
| Methods | public java.lang.String getName( )<br>public java.lang.String getValue( )<br>public int getPriority( ) |
| public class<br>weblogic.debugging.packet.SetMethodBreakpointResponsePacket extends<br>weblogic.debugging.packet.DebugPacket | |

Sent from the proxy to the IDE in response to a SetMethodBreakpointRequestPacket

| Constructors | public SetMethodBreakpointResponsePacket(<br>    String className,<br>    String method,<br>    String[ ] params,<br>    String status) |
|---|---|
| Methods | public java.lang.String getClassName( )<br>public java.lang.String getMethod( )<br>public java.lang.String[ ] getParams( )<br>public java.lang.String getStatus( ) |
| public class<br>weblogic.debugging.packet.SetMethodBreakpointRequestPacket<br>extends weblogic.debugging.packet.DebugPacket | |

Sent from IDE to proxy to request a breakpoint be set on a method

| Constructors | public SetMethodBreakpointRequestPacket(<br>    String clazz,<br>    String method,<br>    String[ ] params,<br>    int id,<br>    String langExt) |
|---|---|
| Methods | public java.lang.String getClazz( )<br>public java.lang.String getMethod( )<br>public java.lang.String[ ] getParams( )<br>public int getId( )<br>public java.lang.String getLangExt( ) |
| public class<br>weblogic.debugging.packet.SetExceptionBreakpointRequestPacket<br>extends<br>weblogic.debugging.packet.DebugPacket | |
| Constructors | public<br>SetExceptionBreakpointRequestPacket(<br>    String exceptionClass,<br>    boolean caught,<br>    boolean uncaught, |

| | -continued |
|---|---|
| | int id,<br>String langExt) |
| Methods | public java.lang.String getExceptionClass( )<br>public boolean isCaught( )<br>public boolean isUncaught( )<br>public int getId( )<br>public java.lang.String getLangExt( )<br>public int getPriority( )<br>public java.lang.String toString( ) |
| public class<br>weblogic.debugging.packet.SetConditionalBreakpointRequestPacket<br>extends<br>weblogic.debugging.packet.DebugPacket | |

Request to set a conditional breakpoint, sent from IDE to proxy. Response comes back as a SetBreakpointResponsePacket, NOT a SetConditionalBreakpointResponsePacket

| Constructors | public<br>SetConditionalBreakpointRequestPacket(<br>    String name,<br>    int lineNumber,<br>    int id,<br>    String condition) |
|---|---|
| Methods | public java.lang.String getName( )<br>public int getLineNumber( )<br>public int getId( )<br>public java.lang.String getCondition( )<br>public int getPriority( ) |
| public class<br>weblogic.debugging.packet.SetBreakpointResponsePacket<br>extends weblogic.debugging.packet.DebugPacket | |

Sent from the proxy in response to a SetBreakPointRequestPacket from the IDE. Contains information about success/failure to set the breakpoint.

| | |
|---|---|
| Constructors | public SetBreakpointResponsePacket(<br>    String className,<br>    int origLine,<br>    int actualLine,<br>    String status,<br>    int id) |
| Methods | public java.lang.String getClassName( )<br>public int getOriginalLine( )<br>public int getActualLine( )<br>public java.lang.String getStatus( )<br>public int getId( )<br>public int getPriority( ) | public class weblogic.debugging.packet.SetBreakpointRequestPacket extends weblogic.debugging.packet.DebugPacket Sent from IDE to proxy to tell it to set a breakpoint

| | |
|---|---|
| Constructors | public SetBreakpointRequestPacket(<br>    String name,<br>    int lineNumber,<br>    Map props,<br>    int id,<br>    String langExt) |
| Methods | public java.lang.String getName( )<br>public int getLineNumber( )<br>public int getId( )<br>public java.lang.String getLangExt( )<br>public java.util.Map getProperties( )<br>public int getPriority( )<br>public java.lang.String toString( ) | public class weblogic.debugging.packet.ProcessDonePacket extends weblogic.debugging.packet.DebugPacket

| | |
|---|---|
| Constructors | public ProcessDonePacket( ) |
| Methods | public int getPriority( ) | public class weblogic.debugging.packet.PausePacket extends weblogic.debugging.packet.DebugPacket

| | |
|---|---|
| Constructors | public PausePacket( ) |
| Methods | public int getPriority( )<br>public java.lang.String toString( ) | public class weblogic.debugging.packet.NetworkMap implements java.io.Serializable This class holds a map, and makes sure it serializes to a form that makes sense

| | |
|---|---|
| Constructors | public NetworkMap(<br>    Map m) |
| Methods | public java.util.Map getMap( )<br>public void setMap(<br>    Map m) | public class weblogic.debugging.packet.InitPacket extends weblogic.debugging.packet.DebugPacket

| | |
|---|---|
| Constructors | public InitPacket(<br>    int lineNumber,<br>    String className,<br>    String sourceFile,<br>    int id) |
| Methods | public int getLineNumber( )<br>public java.lang.String getClassName( )<br>public java.lang.String getSourceFile( )<br>public int getId( )<br>public int getPriority( )<br>public boolean overridesLowerPriorityPackets( ) | public class weblogic.debugging.packet.GoResponsePacket extends weblogic.debugging.packet.DebugPacket

| | |
|---|---|
| Constructors | public GoResponsePacket( ) |
| Methods | public int getPriority( )<br>public boolean overridesLowerPriorityPackets( ) | public class weblogic.debugging.packet.GoRequestPacket extends weblogic.debugging.packet.DebugPacket

| | |
|---|---|
| Constructors | public GoRequestPacket(<br>    long threadId) |
| Methods | public long getThreadId( )<br>public int getPriority( )<br>public boolean overridesLowerPriorityPackets( ) | public class weblogic.debugging.packet.GetVisibleVariablesResponsePacket extends weblogic.debugging.packet.DebugPacket

| | |
|---|---|
| Constructors | public GetVisibleVariablesResponsePacket(<br>    String[ ] variables,<br>    ValueResponse[ ] values) |
| Methods | public java.lang.String[ ] getVariables( )<br>public weblogic.debugging.packet.ValueResponse[ ] getValues( ) | public class weblogic.debugging.packet.GetVisibleVariablesRequestPacket extends weblogic.debugging.packet.DebugPacket

| | |
|---|---|
| Constructors | public GetVisibleVariablesRequestPacket(<br>    int frame,<br>    long threadId) |
| Methods | public int getFrame( )<br>public long getThreadId( ) | public class weblogic.debugging.packet.GetValueResponsePacket extends weblogic.debugging.packet.DebugPacket

| | |
|---|---|
| Constructors | public GetValueResponsePacket(<br>    ValueResponse val) |

-continued

|  |  |
|---|---|
|  | public GetValueResponsePacket(<br>    String variable,<br>    String value,<br>    String valueType,<br>    boolean complex,<br>    boolean editable)<br>public GetValueResponsePacket(<br>    String variable,<br>    String value,<br>    String valueType,<br>    boolean complex,<br>    boolean editable,<br>    int arrayLength) |
| Methods | public java.lang.String getVariable( )<br>public java.lang.String getValue( )<br>public java.lang.String getValueType( )<br>public boolean isComplex( )<br>public boolean isEditable( )<br>public boolean isArray( )<br>public int getArrayLength( )<br>public java.lang.String toString( )<br>public weblogic.debugging.packet.ValueResponse getValueResponse( ) |
| public class weblogic.debugging.packet.GetValueRequestPacket extends weblogic.debugging.packet.DebugPacket | |
| Constructors | public GetValueRequestPacket(<br>    int frame,<br>    long threadId,<br>    String variable) |
| Methods | public int getFrame( )<br>public long getThreadId( )<br>public java.lang.String getVariable( )<br>public java.lang.String toString( ) |
| public class weblogic.debugging.packet.GetThreadsResponsePacket extends weblogic.debugging.packet.DebugPacket | |
| Constructors | public GetThreadsResponsePacket(<br>    long[ ] ids,<br>    String[ ] names,<br>    StackFrameInfo[ ][ ] callStacks) |
| Methods | public long[ ] getIds( )<br>public java.lang.String[ ] getNames( )<br>public weblogic.debugging.comm.StackFrameInfo[ ][ ] getCallStacks( ) |
| public class weblogic.debugging.packet.GetThreadsRequestPacket extends weblogic.debugging.packet.DebugPacket | |
| Constructors | public GetThreadsRequestPacket( ) |
| public class weblogic.debugging.packet.GetStackFramesResponsePacket extends weblogic.debugging.packet.DebugPacket | |
| Constructors | public GetStackFramesResponsePacket(<br>    StackFrameInfo[ ] stackFrames,<br>    long threadId) |
| Methods | public weblogic.debugging.comm.StackFrameInfo[ ] getStackFrames( )<br>public long getThreadId( ) |
| public class weblogic.debugging.packet.GetStackFramesRequestPacket extend weblogic.debugging.packet.DebugPacket | |
| Constructors | public GetStackFramesRequestPacket( ) |
| public class weblogic.debugging.packet.GetFieldsResponsePacket extends weblogic.debugging.packet.DebugPacket | |
| Constructors | public GetFieldsResponsePacket(<br>    String variable,<br>    String[ ] fields,<br>    ValueResponse[ ] fieldValues) |
| Methods | public java.lang.String getVariable( )<br>public java.lang.String[ ] getFields( )<br>public weblogic.debugging.packet.ValueResponse[ ] getValues( ) |
| public class weblogic.debugging.packet.GetFieldsRequestPacket extends weblogic.debugging.packet.DebugPacket | |
| Constructors | public GetFieldsRequestPacket(<br>    int frame,<br>    long threadId,<br>    String variable) |
| Methods | public int getFrame( )<br>public long getThreadId( )<br>public java.lang.String getVariable( ) |
| public class weblogic.debugging.packet.GetBreakpointsResponsePacket extends weblogic.debugging.packet.DebugPacket | |
| Constructors | public GetBreakpointsResponsePacket(<br>    String[ ] breakpoints) |

-continued

| | |
|---|---|
| Methods | public java.lang.String[ ] getBreakpoints( )  |
| | public class weblogic.debugging.packet.GetBreakpointsRequestPacket extends weblogic.debugging.packet.DebugPacket |
| Constructors | public GetBreakpointsRequestPacket( ) |
| | public class weblogic.debugging.packet.ExitPacket extends weblogic.debugging.packet.DebugPacket |
| Constructors | public ExitPacket( ) |
| | public class weblogic.debugging.packet.ExceptionPacket extends weblogic.debugging.packet.DebugPacket |
| Constructors | public ExceptionPacket( |
| |     int lineNumber, |
| |     String methodName, |
| |     String fileName, |
| |     String message, |
| |     String[ ] stackFrames) |
| Methods | public int getLineNumber( ) |
| | public java.lang.String getMethodName( ) |
| | public java.lang.String getFileName( ) |
| | public java.lang.String getMessage( ) |
| | public java.lang.String[ ] getStackFrames( ) |
| | public class weblogic.debugging.packet.DoneStopSetupPacket extends weblogic.debugging.packet.DebugPacket |
| Constructors | public DoneStopSetupPacket( ) |
| Methods | public int getPriority( ) |
| | public class weblogic.debugging.packet.DoneStartSetupPacket extends weblogic.debugging.packet.DebugPacket |
| Constructors | public DoneStartSetupPacket( ) |
| Methods | public int getPriority( ) |
| | public class weblogic.debugging.packet.DisconnectResponsePacket extends weblogic.debugging.packet.DebugPacket |
| Constructors | public DisconnectResponsePacket( ) |
| Methods | public int getPriority( ) |
| | public class weblogic.debugging.packet.DisconnectRequestPacket extends weblogic.debugging.packet.DebugPacket |
| Constructors | public DisconnectRequestPacket( ) |
| Methods | public int getPriority( ) |
| | public boolean overridesLowerPriorityPackets( ) |
| | public class weblogic.debugging.packet.DisconnectReconnectPacket extends weblogic.debugging.packet.DebugPacket |
| Constructors | public DisconnectReconnectPacket( ) |
| Methods | public int getPriority( ) |
| | public abstract class weblogic.debugging.packet.DebugPacket implements java.io.Serializable |
| Base class for all | debugger communication packets. |
| Constructors | public DebugPacket( ) |
| Methods | public int getPriority( ) |
| | Subclasses should override to specify a different priority |
| | Returns |
| |     Default priority for all DebugPackets, MEDIUM_PRIORITY |
| | public boolean overridesLowerPriorityPackets( ) |
| | Subclasses should override if they invalidate old |
| | data that may be queued for sending. |
| | Returns |
| |     Default - false |
| Fields | public static final IMMEDIATE_PRIORITY |
| | public static final HIGH_PRIORITY |
| | public static final MEDIUM_PRIORITY |
| | public static final LOW_PRIORITY |
| | public class weblogic.debugging.packet.ClearMethodBreakpointPacket extends weblogic.debugging.packet.DebugPacket |

Sent from the IDE to the proxy to tell it to remove a method breakpoint

Sent from IDE to proxy to ask to remove an already set breakpoint

| | |
|---|---|
| Constructors | public ClearMethodBreakpointPacket( ) |
| | public class weblogic.debugging.packet.ClearBreakpointResponsePacket extends weblogic.debugging.packet.DebugPacket |
| Constructors | public ClearBreakpointResponsePacket( ) |
| Methods | public int getPriority( ) |
| | public class weblogic.debugging.packet.ClearBreakpointRequestPacket extends weblogic.debugging.packet.DebugPacket |

| | |
|---|---|
| Constructors | public ClearBreakpointRequestPacket( |
| |     String className, |
| |     int line, |
| |     int id) |
| Methods | public int getId( ) |
| | public java.lang.String getClassName( ) |
| | public int getLine( ) |
| | public int getPriority( ) |

-continued

| Fields | public__id |
| | public__className |
| | public__line |
| public class weblogic.debugging.packet.ClearAllBreakpointsResponsePacket extends weblogic.debugging.packet.DebugPacket | |
| Constructors | public ClearAllBreakpointsResponsePacket( ) |
| Methods | public int getPriority( ) |
| public class weblogic.debugging.packet.ClearAllBreakpointsRequestPacket extends weblogic.debugging.packet.DebugPacket | |

Sent from the IDE to the proxy to remove all currently set breakpoints

| Constructors | public ClearAllBreakpointsRequestPacket( ) |
| Methods | public int getPriority( ) |
| public class weblogic.debugging.packet.BreakpointHitPacket extends weblogic.debugging.packet.DebugPacket | |

Sent from proxy to IDE to tell it the VM being debugged hit a breakpoint. Includes relevant information that will likely be displayed in the IDE.

| Constructors | public BreakpointHitPacket( |
| | int lineNumber, |
| | String className, |
| | String sourceFile, |
| | int id, |
| | String message, |
| | long threadId) |
| Methods | public int getLineNumber( ) |
| | public java.lang.String getClassName( ) |
| | public java.lang.String getSourceFile( ) |
| | public int getId( ) |
| | public int getPriority( ) |
| | public boolean overridesLowerPriorityPackets( ) |
| | public java.lang.String getMessage( ) |
| | public long getThreadId( ) |
| | public java.lang.String toString( ) |

Priority Queue

In one embodiment, a debugging proxy can use a priority queue. A priority queue can be implemented using several individual queues, such as one for each available priority. When a new request message arrives from the client, the debugging proxy can examine its priority and places the message on the corresponding queue. If the message is an override message, the debugging proxy can remove all the messages from each queue with a lower priority number than the override message.

Worker threads can process messages with immediate priority first. Then, the threads can begin checking for messages in the queues. Worker threads can check the highest priority queue first. If there is at least one message in the highest priority queue (e.g., HIGH), the worker threads can remove and process the message on the front of that queue. If the highest priority queue is empty, the worker threads can check the next highest priority queue (e.g., MEDIUM). If there is at least one message on the next highest priority queue, the worker threads can remove the message on the front of the queue and process that message. This process can continue in reverse priority order (i.e., highest priority to lowest priority) as long as the debugging proxy is running. If all queues are empty, the worker threads can continue checking starting again with the highest priority queue and working down to the lowest.

In one embodiment, message priorities are assigned statically based on message type. In another embodiment, message priorities may be assigned dynamically based on information that changes at run-time. For example, messages requesting information currently visible in the IDE or that the user has examined frequently may be given higher priority than messages requesting information that is not currently visible or has been accessed less frequently. In this embodiment, the client may be given an API for adjusting the default priorities of some messages.

Debugging Communication Infrastructure

This section contains details of an exemplary communication infrastructure that can be used to send and receive debugging messages in one embodiment. A client can use a AsyncSocketComm class to send requests to and accept responses from the proxy. The proxy may use the PriorityComm class to accept requests from and generate responses back to the client. Requests accepted by PriorityComm may implement the priority scheme described above.

If the proxy is located in the same process space as the debugger on the server, it may use the InProcComm to send requests to and receive responses from the debugger on the server without incurring the cost of network communications. If the proxy is not located on the server, it may use ServerSocketComm to communicate with the server. It may also use ServerSocketCommAsync to communicate with the server e.g. for receiving asynchronous events from the server such as "Hit breakpoint" messages.

Communications Package Summary

| Interface Summary | |
| --- | --- |
| CommTransport | This interface defines the communication methods used. |
| DebugCommands | The DebugCommands interface is the interface that defines the debugging commands going from the UI portion of the debugger, to the debug proxy. |
| DebugConstants | The DebugConstants interface is an interface that DebugCommands and DebugEvents derive from. |
| DebugEvents | The DebugEvents interface is the interface that defines the debugging events that come from the proxy to the IDE. |
| IDebuggableLanguage | A scripting engine must implement this interface in order to be able to set itself up to debug in the KNEX framework. |

| | |
|---|---|
| IDebuggableLanguage.IBreakpointInfo | |
| IDebuggableLanguage.IComplexScriptValue | |
| IDebuggableLanguage.IJavaValue | |
| IDebuggableLanguage.IOtherLanguageValue | |
| IDebuggableLanguage.IScriptArrayValue | |
| IDebuggableLanguage.IScriptFrame | |
| IDebuggableLanguage.IScriptValue | |
| IDebuggableLanguage.ISimpleScriptValue | |
| IScriptContextHolder | This interface is used to get a context object for a given frame. |
| IScriptController | The script controller will be an object that interoperates with the scripting languages to bring you script debugging. |
| ServerCommands | The ServerCommands interface is the interface that defines the debugging commands going from the KNEX Server to the proxy. |
| ServerEvents | The ServerEvents interface is the interface that defines the debugging events that come from the KNEX Server to the Proxy. |

| Class Summary | |
|---|---|
| AsyncCommBase | The class wrapps a CommTransport, and adds a level of indirection to make the network communications nondependant on the message processing. |
| AsyncSocketComm | AsyncSocketComm is a class that will use a SocketComm for sending and recieving requests, but has another thread that is doing the actual sends/recieves and queuing them to a buffer. |
| ConnectInfo | |
| DebugController | The DeBugController is the major piece of code that goes between the client and the server. |
| DebugInfo | The class keeps track of the info we need to be able to attach to JDI on another process. |
| DebugKillException | The is an exception that will be used to kill threads in Weblogic. |
| InProcComm | |
| InProcMedium | |
| IScriptController.LanguageInfo | |
| JavaStackFrameInfo | Simple data holder for a stack frame in the VM that's being debugged |
| JspStackFrameInfo | |
| PriorityComm | The class wrapps other CommTransports, then when a message comes in off another transport, this will check it's priority, and if the priority is the highest, it will execute it immediately. |
| PriorityQueue | |
| ScriptStackFrameInfo | This colds the proper stack information for a stack that is translated from script. |
| ServerConnectInfo | groks all the info about creating a connection from the proxy to the Knex Server. |
| ServerController | The ServerController is the major piece of code that goes between the proxy and the KNEX server. |
| ServerSocketComm | ServerSocketCommAsync is a class that will use a SocketComm for sending and receiving requests, but has another thread that is doing the actual sends/receives and queuing them to a buffer. |
| SocketComm | SocketComm is Transport class that will transport over TCP. |
| StackFrameInfo | Simple data holder for a stack frame in the VM that's being debugged |

| Exepction Summary | |
|---|---|
| DbgCtrlSocketException | |
| DisconnectReconnectException | |
| SocketCommException | |
| TransportException | This is the root exception thrown for transport errors |
| TransportTimeoutException | |

Communications Package Details

This section describes details of the classes, interfaces and exceptions listed above.

```
public  class  weblogic.debugging.comm.TransportTimeoutException  extends
               weblogic.debugging.comm.TransportException
Constructors              public TransportTimeoutException( )
                          public TransportTimeoutException(
                              String str)
                          public TransportTimeoutException(
                              Exception e)
public       class    weblogic.debugging.comm.TransportException
extends
java.io.IOException
```

This is the root exception thrown for transport errors

| | |
|---|---|
| Constructors | public TransportException( )<br>public TransportException(<br>    String str)<br>public TransportException(<br>    Exception e) |
| Methods | public java.lang.Exception getPreviousException( ) |
| Fields | protected _e | public class weblogic.debugging.comm.StackFrameInfo implements java.io.Serializable Simple data holder for a stack frame in the VM that's being debugged

| | |
|---|---|
| Constructors | public StackFrameInfo(<br>    String className,<br>    String sourceName,<br>    String methodName,<br>    int lineNumber,<br>    int frameIndex) |
| Methods | public java.lang.String getClassName( )<br>public java.lang.String getSourceName( )<br>public java.lang.String getMethodName( )<br>public int getLineNumber( )<br>public int getFrameIndex( )<br>public java.lang.String[ ] getVariables(<br>    ThreadReference tr,<br>    Object sfh)<br>public ObjectReference getThis(<br>    ThreadReference tr,<br>    Object sfh) |
| Fields | protected _className<br>protected _sourceName<br>protected _methodName<br>protected _lineNumber<br>protected _javaFrameIndex | public class weblogic.debugging.comm.SocketCommException extends weblogic.debugging.comm.TransportException

| | |
|---|---|
| Constructors | public SocketCommException( )<br>public SocketCommException(<br>    String s)<br>public SocketCommException(<br>    Exception e) | public class weblogic.debugging.comm.SocketComm implements weblogic.debugging.comm.CommTransport SocketComm is Transport class that will transport over TCP

| | |
|---|---|
| Constructors | public SocketComm( ) |
| Methods | public void accept(<br>    ServerSocket ss)<br>If this SocketComm is being used on a server socket, this method will wait until a client opens a connection with it. Then it will initialize this class to send and recive off of that socket.<br>public void attach(<br>    String serverName,<br>    int socketNum)<br>If this SocketComm is initiating communication with another process, this method will attach to the other process and initialize the SocketComm to start to send a recieve off that socket.<br>protected boolean isPacketAvailable( )<br>public weblogic.debugging.packet.DebugPacket getPacket( ) |

-continued

| | |
|---|---|
| | public weblogic.debugging.packet.DebugPacket getPacket(<br>    int timeout)<br>public void sendPacket(<br>    DebugPacket packet)<br>public void close( )<br>public java.net.Socket getSocket( )<br>protected final boolean Log(<br>    String str) | public class weblogic.debugging.comm.ServerSocketCommAsync implements weblogic.debugging.comm.CommTransport, java.lang.Runnable ServerSocketCommAsync is a class that will use a SocketComm for sending and receiving requests, but has another thread that is doing the actual sends/receives and queuing them to a buffer. This other thread will hang out and wait on a ServerSocket, until it can party on that socket.

| | |
|---|---|
| Constructors | public ServerSocketCommAsync( ) |
| Methods | public void setServerSocket(<br>    ServerSocket ssT)<br>If this SocketComm is being used on a server socket, this method will wait until a client opens a connection with it. Then it will initialize this class to send and recive off of that socket.<br>public weblogic.debugging.packet.DebugPacket getPacket(<br>    int timeout)<br>public void sendPacket(<br>    DebugPacket packet)<br>public void reset( )<br>public void close( )<br>public void run( )<br>public weblogic.debugging.packet.DebugPacket getPacket( ) | public class weblogic.debugging.comm.ServerSocketComm implements weblogic.debugging.comm.CommTransport ServerSocketCommAsync is a class that will use a SocketComm for sending and reciving requests, but has another thread that is doing the actual sends/recieves and queuing them to a buffer. This other thread will hang out and wait on a ServerSocket, until it can party on that socekt.

| | |
|---|---|
| Constructors | public ServerSocketComm( ) |
| Methods | public void setServerSocket(<br>    ServerSocket ssT)<br>If this SocketComm is being used on a server socket, this method will wait until a client opens a connection with it. Then it will initialize this class to send and recive off of that socket.<br>public weblogic.debugging.comm.SocketComm getSocketComm( )<br>public void accept( )<br>public weblogic.debugging.packet.DebugPacket getPacket(<br>    int timeout)<br>public void sendPacket(<br>    DebugPacket packet)<br>public void reset(<br>    boolean fClose)<br>public void close( )<br>public weblogic.debugging.packet.DebugPacket getPacket( ) | public interface weblogic.debugging.comm.ServerEvents

The ServerEvents interface is the interface that defines the debugging events that come from the KNEX Server to the Proxy. This will also define the events that come from the different languages to the Proxy. These same interfaces will be used to talk from the Proxy to the different languages.

| | |
|---|---|
| Methods | public void initDone( ) |
| | public void requestLanguagePacket( ) |
| | requests information about the languages currently loaded on the server. |
| | public void pushRequestDone( ) |

| | |
|---|---|
| | sends a message to the script engine saying we've processed it's request. |
| | public class weblogic.debugging.comm.ServerController implements weblogic.debugging.comm.ServerCommands, weblogic.debugging.comm.ServerEvents |

The ServerController is the major piece of code that goes between the proxy and the KNEX server. This code will be shared by the

| | |
|---|---|
| Constructors | public ServerController( |
| |     CommTransport transport) |
| Methods | public weblogic.debugging.comm.CommTransport setTransport( |
| |     CommTransport transport) |
| | public void close( ) |
| | public void processNextEvent( |
| |     ServerEvents serverEvents) |
| | public void init( |
| |     String serverName, |
| |     boolean fNeedsResponse) |
| | public void operationDone( ) |
| | public void shutdown( ) |
| | public void scriptStart( ) |
| | public void scriptStop( ) |
| | public void processNextCommand( |
| |     ServerCommands serverCommands) |
| | processNextCommand will get the next command from the CommTransport, and call into the appropriate function in the Server's DebugCommands interface. This is called by the Debug Engine code. |
| | public static void processCommand( |
| |     DebugPacket packet, |
| |     ServerCommands serverCommands) |
| | public void initDone( ) |
| | public void pushRequestDone( ) |
| | public void requestLanguagePacket( ) |
| | requests information about the languages currently loaded on the server. |
| | public class weblogic.debugging.comm.ServerConnectInfo extends weblogic.debugging.comm.ConnectInfo |
| | groks all the info about creating a connection from the proxy to the KNEX Server. |
| Constructors | public ServerConnectInfo( ) |
| Methods | public void processCmdLineArgs( |
| |     String[ ] args) |
| | public weblogic.debugging.comm.CommTransport createTransport( ) |
| | public weblogic.debugging.comm.CommTransport createClientTransport( ) |
| | public void printUsage1( |
| |     StringBuffer buff) |
| | Prints the Commandline params we understand here. This will only print the usage that should appear on the first line of the usage. param buff -- This is the string buffer to append usage info into. |
| | public void printUsage2( |
| |     StringBuffer buff) |
| | Prints the Commandline params we understand here. This will only print the usage that should appear in the body of the usage. param buff -- This is the string buffer to append usage info into. |
| Fields | public static final default Port |
| | public interface weblogic.debugging.comm.ServerCommands implements weblogic.debugging.comm.DebugConstants |

The ServerCommands interface is the interface that defines the debugging commands going from the KNEX Server to the proxy. These same interfaces will be used to talk from the Proxy to the different languages.

| | |
|---|---|
| Methods | public void init(<br>    String serverName,<br>    boolean fNeedsResponse)<br>Sends an initialization packet to the proxy.<br>public void operationDone( )<br>Sends a message telling the proxy the current web operation has completed. There may very possibly be another operation in the process of completing at this point.<br>public void shutdown( )<br>Sends a message to the proxy telling it to shut itself down. This is not the same thing as detaching for the Server, this will actually close the process.<br>public void scriptStart( )<br>public void scriptStop( ) |
| public class weblogic.debugging.comm.ScriptStackFrameInfo extends weblogic.debugging.comm.StackFrameInfo | |

This holds the proper stack information for a stack that is translated from script

| | |
|---|---|
| Constructors | public ScriptStackFrameInfo(<br>    String className,<br>    String sourceName,<br>    String methodName,<br>    int lineNumber,<br>    String langExt,<br>    ObjectReference contextObject,<br>    int stackIndex,<br>    int javaStackIndex,<br>    ProxyScriptEngine pse) |
| Methods | public ObjectReference getContextObject( )<br>public java.lang.String getLanguageExtension( )<br>public int getStackIndex( )<br>public void setServerInfo(<br>    ArrayReference a)<br>public java.lang.String[ ] getVariables(<br>    ThreadReference tr,<br>    Object sfhObj)<br>public ObjectReference getThis(<br>    ThreadReference tr,<br>    Object sfhObj)<br>public Value getLocalVariable(<br>    String name,<br>    ThreadReference tr)<br>public Value setVariable(<br>    String name,<br>    String strNewVal,<br>    ThreadReference tr) |
| public class weblogic.debugging.comm.PriorityQueue extends weblogic.debugging.utils.SynchQueue | |
| Methods | public synchronized java.lang.Object getObject(<br>    int timeout)<br>public synchronized void putObject(<br>    Object o,<br>    int priority,<br>    boolean clearLesser)<br>public synchronized java.lang.Object[ ] getAllObjects( ) |

-continued

| | |
|---|---|
| | This gets all the Objects in the array that are not already promised to a waiter and returns them in an Array. Note, that this will take the highest priority bunch, which means that if you call this while other threads are using the Queue, this call will tend to get the high priority items rather than the other threads. |
| public class weblogic.debugging.comm.PriorityComm extends weblogic.debugging.comm.AsyncCommBase | |

This class wraps other CommTransports, then when a message comes in off another transport, this will check it's priority, and if the priority is the highest, it will execute it immediately. Otherwise, it will pass it along like normal. NOTE: Although this extends AsyncSocketComm, it does not have to communicate via Sockets

| | |
|---|---|
| Methods | protected void processInput(<br>    DebugPacket packet) |
| public class weblogic.debugging.comm.JspStackFrameInfo extends weblogic.debugging.comm.JavaStackFrameInfo | |
| Constructors | public JspStackFrameInfo(<br>    String className,<br>    String methodName,<br>    int lineNumber,<br>    int javaFrameIndex,<br>    Notify notify,<br>    ThreadReference thread) |
| Methods | public java.lang.String getSourceName( )<br>public void setCorrectedFrameIndex(<br>    int i) |
| public class weblogic.debugging.comm.JavaStackFrameInfo extends weblogic.debugging.comm.StackFrameInfo | |

Simple data holder for a stack frame in the VM that's being debugged

| | |
|---|---|
| Constructors | public JavaStackFrameInfo(<br>    String className,<br>    String sourceName,<br>    String methodName,<br>    int lineNumber,<br>    int javaFrameIndex) |
| Methods | public java.lang.String[ ] getVariables(<br>    ThreadReference tr,<br>    Object sfh)<br>public ObjectReference getThis(<br>    ThreadReference tr,<br>    Object sfh) |
| public interface weblogic.debugging.comm.IScriptController | |

The script controller will be an object that interoperates with the scripting languages to bring you script debugging. The way this will work is each language engine will have an instance of the IScriptController, and the IScriptController will have list of all the IDebuggableLanguage interfaces.

| | |
|---|---|
| Methods | public weblogic.debugging.comm.IScriptController.LanguageInfo[ ] getLanguages( )<br>returns a list that contains LanguageInfo. There will be one for each language.<br>public int Break( ) |

-continued

|   |   |
|---|---|
| | This is what a running script will call when it wants to break. This is a waiting call, that will not return until the thread has been told to continue. The frames parameter should be a list of IDebuggableLanguage$IScriptFrame .<br>Parameters<br>    frames - - should be the frame list for the current script context.<br>Returns<br>    the return value tells the scripting engine what command resumed the break.<br>public int Pause(<br>    int pauseID)<br>this is what the scripting lanuguage calls when it's time to pause itself.<br>Returns<br>    the return value tells the scripting engine what command resumed the pause.<br>public boolean StartScript( )<br>This is what a script engine must call when starting execution. This is how the engine will know if the thread is currently in the middle of a step or not.<br>Returns<br>    the return value tells the scripting engine what kind of execution we are in the middle of.<br>public boolean ResumeScript( )<br>This is what a script engine must call when resuming execution. This is how the engine will know if the thread is currently in the middle of a step or not.<br>Returns<br>    the return value tells the scripting engine what kind of execution we are in the middle of.<br>public weblogic.debugging.comm.IDebuggableLanguage.IScriptValue processScriptValue(<br>    IDebuggableLanguage.IScriptValue value)<br>processes an IScriptValue by passingit off to the script engine that knows about it, then it will return a new IScritpValue that knows more about that value.<br>public void breakpointProcessed(<br>    IDebuggableLanguage.IBreakpointInfo bpi)<br>This tells the script controller that a breakpoint that was previously un-resolvable has now been resolved.<br>public weblogic.debugging.comm.IDebuggableLanguage.IScriptFrame[ ] getStack(<br>    String langExt,<br>    Object context)<br>This gets the stack frames for the script language specified, using the context specified.<br>Parameters<br>    langExt - -- This is the language extension for the language we are inspecting.<br>    context - -- This is the language context we are investigating.<br>Returns<br>    an array of the stackframes this yeilds. |
| Fields | public static final RESUME_CONTINUE<br>public static final RESUME_STEP_IN<br>public static final RESUME_STEP_OUT<br>public static final RESUME_STEP_OVER<br>public static final RESUME_STOP |
| | public static class weblogic.debugging.comm.IScriptController.LanguageInfo implements java.io.Serializable |
| Constructors | public IScriptController.LanguageInfo(<br>    String languageName,<br>    String[ ] languageExtensions,<br>    String[ ] languageFilters,<br>    String[ ] contextHolders) |
| Fields | public final _languageName<br>public final _languageExtensions<br>public final _languageFilters<br>public final _contextHolders<br>public transient _lang |
| | public interface weblogic.debugging.comm.IScriptContextHolder |

This interface is used to get a context object for a given frame. The way this will work is that the Proxy will go down the stack frame, looking for objects that derive from IScriptContextHolder. When it comes across such a class, it will get the context from the frame and pass it to the DebugScriptController. It is possible for many script frames to all have the same context. In this case, the frame will only get passed to the DebugScriptController once.

| | |
|---|---|
| Methods | public java.lang.Object getContext( ) |
| | public class weblogic.debugging.comm.InProcMedium |

-continued

| | |
|---|---|
| Constructors | public InProcMedium( ) |
| Methods | public void close( ) |
| | public class weblogic.debugging.comm.InProcComm implements weblogic.debugging.comm.CommTransport |
| Constructors | public InProcComm(<br>    SynchQueue in,<br>    SynchQueue out) |

| | -continued |
|---|---|
| Methods | public weblogic.debugging.packetDebug.Packet getPacket( int timeout) public void sendPacket( DebugPacket packet) public void close( ) public weblogic.debugging.packetDebug.Packet getPacket( ) protected final boolean Log( String str) public interface weblogic.debugging.comm.IDebuggableLanguage |

A scripting engine must implement this interface in order to be able to set itself up to debug in the KNEX framework.

| | |
|---|---|
| Methods | public void exit( ) This will be called when we are ending. Problem is that this will not get called in the case of system crashes, etc. public java.lang.String[ ] LanguageFilters( ) This is a list of the classes we should filter to prevent from showing up in the stack. You will be able to use wild cards, such as org.mozilla.rhino.* public java.lang.String[ ] ContextHolders( ) This is a list of the class instances that we can get a script context from. public java.lang.String LanguageName( ) This is a list of the class instances that we can call into to get variable information, etc. When walking through a stack trace, we will go to each of these to ask it to spit out it's stack. We will furthermore. When a user inspects this part of the stack, we will also ask these objects for variable values, etc. public java.lang.String[ ] LanguageExtensions( ) This is a list of the class instances that we can call into to get variable information, etc. When walking through a stack trace, we will go to each of these to ask it to spit out it's stack. We will furthermore. When a user inspects this part of the stack, we will also ask these objects for variable values, etc. public boolean featureEnabled( String feature) This function is used for determining what features this debug engine supports. public boolean pause( Object context, int pauseID) When pause is called, it is up to the script engine to break at the next possible place. This method can be called while the engine is in teh middle of processing, so should be treated as a synchronized. public weblogic.debugging.comm.IDebuggableLanguage.IScriptValue getVariable( Object context, String strVar, int stackFrame) public void setVariable( Object context, String strVar, IDebuggableLanguage.IScriptValue value, int stackFrame) public weblogic.debugging.comm.IDebuggableLanguage.IScriptValue processValue( IDebuggableLanguage.IScriptValue value) public weblogic.debugging.comm.IDebuggableLanguage.IScriptValue processExpression( Object context, String strExpr, int stackFrame) public weblogic.debugging.comm.IDebuggableLanguage.IScriptFrame[ ] getStack( Object context) public weblogic.debugging.comm.IDebuggableLanguage.IBreakpointInfo setSourceBreakpoint( String clazz, int line, int id) public weblogic.debugging.comm.IDebuggableLanguage.IBreakpointInfo setMethodBreakpoint( String clazz, String method, |

|  |  |
|---|---|
|  | String[ ] params,<br>int id)<br>public        weblogic.debugging.comm.IDebuggableLanguage.IBreakpointInfo setWatchpoint(<br>    String clazz,<br>    String varName,<br>    boolean fStopOnRead,<br>    boolean fStopOnWrite,<br>    int id)<br>public void clearBreakpoint(<br>    int id)<br>public void clearAllBreakpoints( ) |
| Fields | public static final EXPRESSION_SUPPORT<br>public static final SOURCE_BREAKPOINT_SUPPORT<br>public static final METHOD_BREAKPOINT_SUPPORT<br>public static final WATCH_POINT_SUPPORT<br>public static final INVALID_PAUSEID |
|  | public static interface weblogic.debugging.comm.IDebuggableLanguage.IScriptValue |
| Methods | public java.lang.String getValue( )<br>This gets the value we should display to the user.<br>public java.lang.String getTypeName( )<br>If this is a language that supports types, this should return the type name of this variable.<br>public void setValue(<br>    String val)<br>This is the value the user typed in, it's up to the script<br>engine to turn this into a value.<br>public int getAbstractType( )<br>This determines if the variable is a complex type, simple type or other languagy type. |
| Fields | public static final SIMPLE_TYPE<br>public static final COMPLEX_TYPE<br>public static final SCRIPT_ARRAY_TYPE<br>public static final OTHER_LANGUAGE_TYPE<br>public static final JAVA_LANGUAGE_TYPE |
|  | public static interface weblogic.debugging.comm.IDebuggableLanguage.ISimpleScriptValue implements weblogic.debugging.comm.IDebuggableLanguage.IScriptValue |
| Methods | public int getPrimativeType( )<br>public boolean getBoolean( )<br>public byte getByte( )<br>public char getChar( )<br>public double getDouble( )<br>public float getFloat( )<br>public int getInt( )<br>public long getLong( )<br>public short getShort( )<br>public java.lang.String getString( ) |
| Fields | public static final TYPE_BOOLEAN<br>public static final TYPE_BYTE<br>public static final TYPE_CHAR<br>public static final TYPE_DOUBLE<br>public static final TYPE_FLOAT<br>public static final TYPE_INT<br>public static final TYPE_LONG<br>public static final TYPE_SHORT<br>public static final TYPE_STRING<br>public static final TYPE_NULL |
|  | public static interface weblogic.debugging.comm.IDebuggableLanguage.IScriptArrayValue implements weblogic.debugging.comm.IDebuggableLanguage.IScriptValue |
| Methods | public int getLength( )<br>public weblogic.debugging.comm.IDebuggableLanguage.IScriptValue getElement(<br>    int i) |
|  | public static interface weblogic.debugging.comm.IDebuggableLanguage.IComplexScriptValue implements weblogic.debugging.comm.IDebuggableLanguage.IScriptValue |
| Methods | public java.util.List getMembers( )<br>if this is a complex type, this will return a list of all it's members.<br>public weblogic.debugging.comm.IDebuggableLanguage.IScriptValue getMember(<br>    String name)<br>if this is a complex type, this will return a member of it.<br>public void setMember(<br>    String name,<br>    IDebuggableLanguage. IScriptValue val)<br>if this is a complex type, this will return a member of it.<br>public weblogic.debugging.comm.IDebuggableLanguage.IScriptValue callMethod(<br>    String name,<br>    IDebuggableLanguage.IScriptValue[ ] values) |

```
                calls a method on the comlex type. If the method is a void
                method, it should return a null.
                Otherwise, callMethod should return a scriptValue representing
                the returned value. If that
                value is null, this will be a ScriptValue with the value null.
        public static interface
        weblogic.debugging.comm.IDebuggableLanguage.IOtherLanguageValue
        implements weblogic.debugging.comm.IDebuggableLanguage.IScriptValue
Methods     public java.lang.String getScriptExtension( )
                script extension for this variable.
                public java.lang.Object getValueObject( )
                gets the underlying value object. The other scripting language should be able to figure out
                what this is to be able to create one of the other Script values from this.
        public static interface
        weblogic.debugging.comm.IDebuggableLanguage.IJavaValue            implements
        weblogic.debugging.comm.IDebuggableLanguage.IScriptValue
Methods     public java.lang.Object getValueObject( )
                gets the underlying java object. The proxy will be able to disect this and keep values, etc for
                this.
        public static interface
        weblogic.debugging.comm.IDebuggableLanguage.IScriptFrame
Methods     public java.lang.String getLanguageExtension( )
                This will get the file extension specifying what language this is. If a language supports more
                than one file extension, this will just be one.
                public java.lang.String getFunctionName( )
                If this returns non-null, this string will be used to display the stack frame to the user.
                public java.lang.String getClassName( )
                This is the class name that we will derive the file from. This will be put through the document
                resolution process on the ide.
                public java.lang.String getFileName( )
                This is the class name that we will derive the file from. This will be put through the document
                resolution process on the ide.
                public int getLine( )
                This is the line of execution the current frame is on.
                public java.util.List getFrameVariables( )
                This function will return an array of all the values visible from the current stack. All the values
                in the list that are returned will be of type Strong. To get a value, you will want to call
                IDebuggableLanguage.getVariable
                public weblogic.debugging.comm.IDebuggableLanguage.IScriptValue getThis( )
                This function will return an IScriptValue if there is a this object, otherwise it will return null.
        public static interface
        weblogic.debugging.comm.IDebuggableLanguage.IBreakpointInfo
Methods     public java.lang.String getStatus( )
                public int getOrigLine( )
                public int getCurrLine( )
                public int getId( )
Fields      public static final BREAKPOINT_RESOLVED
                public static final BREAKPOINT_UNRESOLVED
                public static final BREAKPOINT_ERROR
        public class weblogic.debugging.comm.DisconnectReconnectException
        extends weblogic.debugging.comm.TransportException
Constructors   public DisconnectReconnectException( )
        public        class        weblogic.debugging.comm.DebugKillException            extends
        java.lang.Throwable
```

This is an exception that can be used to kill threads in Weblogic

```
Constructors            public DebugKillException( )
        public class weblogic.debugging.comm.DebugInfo
```

This class keeps track of the info we need to be able to attach to JDI on another process.

```
Constructors    public DebugInfo(
                    String server,
                    int port)
                public DebugInfo(
                    String MapName)
                public DebugInfo(
                    ListeningConnector listener,
                    String address)
Methods         public void processCmdLineArgs(
                    String[ ] args)
                public void printUsage1(
                    StringBuffer buff)
                Prints the Commandline params we understand here.
                This will only print the usage that
                should appear on the first line of the usage. param
                buff -- This is the string buffer to append
                usage info into.
                public void printUsage2(
                    StringBuffer buff)
                Prints the Commandline params we understand here.
                This will only print the usage that
                should appear in the body of the usage. param
                buff -- This is the string buffer to append
```

|  |  |
|---|---|
|  | usage info into. |
|  | public void setMaxRetries( |
|  |     int retries) |
|  | public static synchronized java.lang.String getNewMapName( ) |
|  | public static synchronized int getNewPort( ) |
|  | public java.lang.String getTransportType( ) |
|  | public int getPort( ) |
|  | public java.lang.String getMapName( ) |
|  | public java.lang.String getDebugArguments( ) |
|  | This function will get the Debug Commandline arguements needed to start a Java VM |
|  | public VirtualMachine AttachToVm( ) |
| Fields | public static final KEY |
|  | public static final DefaultServer |
|  | public static final DefaultPort |
|  | public static SharedMemory |
|  | public static Sockets |
|  | public static ListeningConnector |
|  | public static PassedVM |
|  | protected static baseTemp |
|  | protected static baseCounter |
|  | protected static lastPort |
|  | protected transportType |
|  | protected port |
|  | protected server |
|  | protected listener |
|  | protected vm |
| public interface weblogic.debugging.comm.DebugEvents | |

The DebugEvents interface is the interface that defines the debugging events that come from the proxy to the IDE. This will also define the events that come from the different languages to the Proxy. These same interfaces will be used to talk from the Proxy to the different languages

|  |  |
|---|---|
| Methods | public void setup( ) |
|  | public void exit( ) |
|  | public void breakHit( |
|  |     int lineNumber, |
|  |     String className, |
|  |     String sourceFile, |
|  |     int id, |
|  |     String message, |
|  |     long threadId) |
|  | public void processDone( ) |
|  | public void getValueDone( |
|  |     ValueResponse value) |
|  | public void setValueDone( |
|  |     String variable, |
|  |     boolean success, |
|  |     String currentValue) |
|  | public void requestFieldsDone( |
|  |     String variable, |
|  |     String[ ] fields, |
|  |     ValueResponse[ ] fieldValues) |
|  | public void requestBreakpointsDone( |
|  |     String[ ] breakpoints) |
|  | public void requestStackFramesDone( |
|  |     StackFrameInfo[ ] frames, |
|  |     long threadId) |
|  | public void requestVisibleVariablesDone( |
|  |     String[ ] variables, |
|  |     ValueResponse[ ] values) |
|  | public void goDone( ) |
|  | public void setBreakpointDone( |
|  |     String className, |
|  |     int origLine, |
|  |     int actualLine, |
|  |     String status, |
|  |     int id) |
|  | public void breakMethodResolved( |
|  |     String className, |
|  |     String method, |
|  |     String[ ] params, |
|  |     String status) |
|  | public void clearBreakpointDone( ) |
|  | public void smartDebuggingDone( |
|  |     boolean fOn) |
|  | public void clearAllBreakpointsDone( ) |
|  | public void disconnectDone( ) |
|  | public void disconnectReconnect( ) |
|  | public void getThreadsDone( |
|  |     long[ ] ids, |
|  |     String[ ] names, |
|  |     StackFrameInfo[ ][ ] callStacks) |
|  | public void setPropertyDone( |
|  |     String prop, |
|  |     String value) |
| Fields | public static final NOT_ARRAY |
|  | Array length value to indicate that the value is not an array |
| public class weblogic.debugging.comm.DebugController implements weblogic.debugging.comm.DebugCommands, weblogic.debugging.comm.DebugEvents | |

A DebugController is a major piece of code that can go between the client and the server. Both sides can go through the DebugController to send debugging messages. The DebugController will then pass the appropriate commands to the appropriate DebugController via the CommTransport that is provided.

|  |  |
|---|---|
| Constructors | public DebugController( |
|  |     CommTransport transport) |
| Methods | public weblogic.debugging.comm.CommTransport setTransport( |
|  |     CommTransport transport) |
|  | public void close( ) |
|  | public void processNextEvent( |
|  |     DebugEvents debugEvents) |
|  | public void clearAllBreakpoints( ) |
|  | public void clearBreakpoint( |
|  |     String className, |
|  |     int line, |
|  |     int id) |
|  | public void disconnect( ) |
|  | public void doneStartSetup( ) |
|  | public void doneStopSetup( ) |
|  | public void getValue( |
|  |     int frame, |
|  |     long threadId, |
|  |     String variable) |
|  | public void requestBreakpoints( ) |
|  | public void requestFields( |
|  |     int frame, |
|  |     long threadId, |
|  |     String variable) |
|  | public void requestStackFrames( ) |
|  | public void requestThreads( ) |
|  | public void requestVisibleVariables( |
|  |     int frame, |
|  |     long threadId) |
|  | public void run( |
|  |     long threadId) |
|  | public void setBreakpoint( |
|  |     String name, |
|  |     int lineNumber, |
|  |     Map props, |
|  |     int id, |
|  |     String langExt) |

-continued

```
public void set Method Breakpoint(
        String clazz,
        String method,
        String[ ] params,
        int id,
        String langExt)
public void setExceptionBreakpoint(
        String exceptionClass,
        boolean caught,
        boolean uncaught,
        int id,
        String langExt)
public void setValue(
        int frame,
        long threadId,
        String variable,
        String newValue)
public void smartDebugging(
        boolean fOn)
public void stepIn(
        long threadId)
public void stepOut(
        long threadId)
public void stepOver(
        long threadId)
public void pause( )
public void setProperty(
        String prop,
        String value)
public boolean processNextCommand(
        DebugCommands debugCommands,
        int timeout)
processNextCommand will get the next command from
the CommTransport, and call into the
appropriate function in the Server's DebugCommands
interface. This is called by the Debug
Engine code.
Returns
        true if there was a JDI event to process,
        false if there wasn't anything. Useful so the
caller can avoid busy waiting by doing a sleep if
there wasn't anything waiting on any of the
queues from which it consumes
public static void processCommand(
        DebugPacket packet,
        DebugCommands debugCommands)
public void init(
        int lineNumber,
        String className,
        String sourceFile,
        int id)
public void breakHit(
        int lineNumber,
        String className,
        String sourceFile,
        int id,
        String message,
        long threadId)
public void exit( )
public void setup( )
public void breakMethodResolved(
        String className,
        String method,
        String[ ] params,
        String status)
public void clearAllBreakpointsDone( )
public void clearBreakpointDone( )
public void disconnectDone( )
public void disconnectReconnect( )
public void getValueDone(
        ValueResponse value)
public void goDone( )
public void processDone( )
public void requestBreakpointsDone(
        String[ ] breakpoints)
```

-continued

```
public void requestFieldsDone(
        String variable,
        String[ ] fields,
        ValueResponse[ ] fieldValues)
public void requestStackFramesDone(
        StackFrameInfo[ ] frames,
        long threadId)
public void requestVisibleVariablesDone(
        String[ ] variables,
        ValueResponse[ ] values)
public void setBreakpointDone(
        String className,
        int origLine,
        int actualLine,
        String status,
        int id)
public void setValueDone(
        String variable,
        boolean success,
        String currentValue)
public void smartDebuggingDone(
        boolean fOn)
public void getThreadsDone(
        long[ ] ids,
        String[ ] names,
        StackFrameInfo[ ][ ] callStacks)
public void setPropertyDone(
        String prop,
        String value)
public interface weblogic.debugging.comm.DebugConstants
```

The DebugConstants interface is an interface that Debug-Commands and DebugEvents derive from. This interface only defines constants that are used for defining the commands.

| | |
|---|---|
| Fields | public static final PAUSE |
| | public static final KILL |
| | public static final BREAKPOINT_RESOLVED |
| | public static final BREAKPOINT_UNRESOLVED |
| | public static final BREAKPOINT_ERROR |
| | public static final DebugSocket |
| | public static final DebugInteruptSocket |
| | public static final JWS_DEBUGCONTEXT |
| | public static final JWS_STARTCONTEXT |
| | public static final JWS_ENDCONTEXT |
| | public static final BP_PROP_CONDITION |

```
public interface weblogic.debugging.comm.DebugCommands
    implements
    weblogic.debugging.comm.DebugConstants
```

The DebugCommands interface is the interface that defines the debugging commands going from the UI portion of the debugger, to the debug proxy. The second half of this is the DebugEvents interface, which defines all the events that are sent from the debugger, to the IDE. These same interfaces will be used to talk from the Proxy to the different languages.

| | |
|---|---|
| Methods | public void doneStartSetup( ) |
| | public void doneStopSetup( ) |
| | public void disconnect( ) |
| | public void run( |
| |     long threadId) |
| | public void stepIn( |
| |     long threadId) |
| | public void stepOver( |
| |     long threadId) |
| | public void stepOut( |
| |     long threadId) |

-continued

```
            public void setBreakpoint(
                String name,
                int lineNumber,
                Map properties,
                int id,
                String langExt)
            public void setMethodBreakpoint(
                String clazz,
                String method,
                String[ ] params,
                int id,
                String langExt)
            public void setExceptionBreakpoint(
                String exceptionClass,
                boolean caught,
                boolean uncaught,
                int id,
                String langExt)
            public void clearBreakpoint(
                String className,
                int line,
                int id)
            public void clearAllBreakpoints( )
            public void requestBreakpoints( )
            public void getValue(
                int frame,
                long threadId,
                String variable)
            public void setValue(
                int frame,
                long threadId,
                String variable,
                String newValue)
            public void requestStackFrames( )
            public void requestThreads( )
            public void requestVisibleVariables(
                int frame,
                long threadId)
            public void requestFields(
                int frame,
                long threadId,
                String variable)
            public void smartDebugging(
                boolean fOn)
            public void pause( )
            public void setProperty(
                String prop,
                String value)
    public    class
    weblogic.debugging.comm.DbgCtrlSocketException    extends
    weblogic.debugging.comm.TransportException
Constructors    public DbgCtrlSocketException( )
                public DbgCtrlSocketException(
                    String s)
                public DbgCtrlSocketException(
                    Exception e)
Methods         public java.lang.Exception getPreviousException( )
    public class weblogic.debugging.comm.ConnectInfo
Constructors    public ConnectInfo(
                    String server,
                    int port,
                    int connectType)
                public ConnectInfo(
                    InProcMedium medium,
                    int connectType)
                public ConnectInfo(
                    ServerSocket ss,
                    int connectType)
Methods         public void setWrap(
                    int wrapType,
                    Object wrapObj)
                public weblogic.debugging.comm.CommTransport
                createTransport( )
                public void close( )
Fields          protected _connectType
                protected _wrapType
                protected _port
                protected _obj
                protected _wrapobj
```

```
                public static final connectSocket
                public static final connectSocketAsync
                public static final connectServerSocketAsync
                public static final connectSameProcessServer
                public static final connectSameProcessClient
                public static final connectServerSocket
                public static final noWrap
                public static final asyncWrap
                public static final priorityWrap
    public interface weblogic.debugging.comm.CommTransport
```

This interface defines the communication methods used.

```
Methods         public void sendPacket(
                    DebugPacket packet)
                public weblogic.debugging.packet.DebugPacket
                getPacket( )
                public weblogic.debugging.packet.DebugPacket
                getPacket(
                    int timeout)
                public void close( )
        public         class
    weblogic.debugging.comm.AsyncSocketComm         extends
    weblogic.debugging.comm.AsyncCommBase
```

AsyncSocketComm is a class that will use a SocketComm for sending and recievine requests, but has another thread that is doing the actual sends/receives and queuing them to a buffer.

```
Constructors                public AsyncSocketComm( )
    public       class
    weblogic.debugging.comm.AsyncCommBase          implements
    weblogic.debugging.comm.CommTransport
```

This class wraps a CommTransport, and adds a level of indirection to make the network communications non-dependant on the message processing.

```
Constructors    protected AsyncCommBase(
                    CommTransport transport)
Methods         public weblogic.debugging.comm.CommTransport
                getTransport( )
                public weblogic.debugging.packet.DebugPacket
                getPacket(
                    int timeout)
                public weblogic.debugging.packet.DebugPacket
                getPacket( )
                public void sendPacket(
                    DebugPacket packet)
                public void close( )
                protected void processInput(
                    DebugPacket packet)
                protected void processOutput(
                    DebugPacket packet)
Fields          protected _transport
                protected volatile _error
                protected _worker
                protected _worker2
                protected _inputQueue
                protected _outputQueue
```

The foregoing description of preferred embodiments of the present invention has been provided for the purposes of illustration and description. It is not intended to be exhaustive or to limit the invention to the precise forms disclosed. Many modifications and variations will be apparent to one of ordinary skill in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implemented method for communicating between a client and a debugging component located on a remote server through a debugging proxy, comprising:
   communicating between the client and the debugging component located on the remote server through a debugging proxy, wherein a user can monitor and control execution of software on the remote server; and
   managing communication between the client and the debugging proxy through a debugging protocol, wherein the debugging protocol supports asynchronous messaging and permits coarse grained messages, and the debugging protocol implements a priority scheme to process messages between the client and the debugging component based upon a priority assigned to each message;
   wherein the client sends coarse grained messages to the debug proxy using the debugging protocol and the debugging proxy sends fine grained messages to the debugging component on the remote server;
   wherein the debugging proxy examines each message, determines a priority, and places the message on a priority queue, wherein priorities are assigned dynamically based on information that changes at run-time, wherein messages requesting information that the user has examined frequently have higher priority than messages requesting information that have been accessed less frequently;
   wherein a plurality of worker threads dequeue and process messages from the priority queue starting with the highest priority items first and working through the remaining items when the plurality of worker threads are not processing immediate priority messages;
   wherein the debugging proxy creates a worker thread for each coarse grained message and the worker thread generates a corresponding series of fine grained messages to a server conforming to the server's standard debugging protocol; wherein the debugging proxy removes items from the response queue in order and sends them asynchronously to the client; and
   wherein communication between the debugging proxy and a native interface of the debugging component is synchronous.

2. The method of claim 1, wherein communication with the debugging component is handled using the debugging component's native interface.

3. The method of claim 1, wherein lower priority requests are automatically overridden it associated results are no longer needed by the client.

4. The method of claim 1, wherein the client can send a request and return control to a user, allowing the user to continue interacting with the client and sending commands.

5. The method of claim 4, wherein the client can send several commands without waiting for results to be returned and displayed.

6. The method of claim 5, wherein results are returned to the client asynchronously, allowing the client to update its display with information as the information becomes available, without disrupting responsiveness of the debugging component to the user.

7. The method of claim 3, wherein if the user steps into another function before values of variables are returned, requests for the values of variables can be cancelled.

8. The method of claim 1, wherein the client generates debug requests to the debug proxy in response to the user's interaction with a user interface.

9. The method of claim 1, wherein an immediate priority message is sent directly from the debugging proxy to a worker thread.

10. The method of claim 9, wherein an override message causes the debugging proxy to remove all pending requests from the priority queue that have a lower priority than the override message.

11. The method of claim 1, wherein the debugging proxy is located on the same machine as the server.

12. The method of claim 11, wherein the debugging proxy is located in the same process as the debugger component on the server.

13. The method of claim 1, wherein the worker thread aggregates all of the required responses from the server into a single coarse grained message and places the coarse grained message into the response queue.

14. The method of claim 13, wherein a debug listener in the client listens for asynchronous results from the server and notifies a user interface as results are received.

15. The method of claim 14, wherein the user interface updates its display based on new information.

16. The method of claim 15, wherein the server generates an asynchronous response every time a breakpoint is encountered.

17. The method of claim 16, wherein worker threads listen for asynchronous events from the server, package the asynchronous events into coarse grained messages, and send the coarse grained messages to the client.

18. The method of claim 1, wherein the debugging protocol includes request and response messages.

19. The method of claim 18, wherein the request and response messages are implemented by serialized objects.

20. The method of claim 19, wherein each message includes a name, a priority, a yes or no value indicating whether the message overrides lower priority messages previously sent, and optional comments.

21. The method of claim 1, wherein the priority queue is implemented using several individual queues.

22. The method of claim 21, wherein there is one individual queue for each priority.

23. The method of claim 22, wherein the debugging proxy examines the priority for each request message and places the message on the corresponding queue.

24. The method of claim 21, wherein if the debugging proxy receives an override message, the debugging proxy removes all the messages from each queue with a lower priority than the override message.

25. The method of claim 21, wherein worker threads process messages with immediate priority first and subsequently process messages in the queues by priority.

26. The method of claim 25, wherein the worker thread removes and processes the message on the front of the highest priority queue.

27. The method of claim 1, wherein priorities are assigned statically based on message type.

28. The method of claim 1, wherein messages requesting information currently visible in an integrated development environment have higher priority than messages requesting information that is not currently visible.

29. The method of claim 1, wherein the client has an application programming interface for adjusting the default priorities of messages.

30. A memory having instructions stored thereon that, when executed by a processor, cause the processor to communicate between a client and a debugging component located on a remote server through a debugging proxy by:
communicating between the client and the debugging component located on the remote server through a debugging proxy, wherein a user can monitor and control execution of software on the remote server; and
managing communication between the client and the debugging proxy through a debugging protocol, wherein the debugging protocol supports asynchronous messaging and permits coarse grained messages, and the debugging protocol implements a priority scheme to process messages between the client and the debugging component based upon a priority assigned to each message;
wherein the client sends coarse grained messages to the debug proxy using the debugging protocol and the debugging proxy sends fine grained messages to the debugging component on the remote server;
wherein the debugging proxy examines each message, determines a priority, and places the message on a priority queue, wherein priorities are assigned dynamically based on information that changes at run-time, wherein messages requesting information that the user has examined frequently have higher priority than messages requesting information that have been accessed less frequently;
wherein a plurality of worker threads dequeue and process messages from the priority queue starting with the highest priority items first and working through the remaining items when the plurality of worker threads are not processing immediate priority messages;
wherein the debugging proxy creates a worker thread for each coarse grained message and the worker thread generates a corresponding series of fine grained messages to a server conforming to the server's standard debugging protocol; wherein the debugging proxy removes items from the response queue in order and sends them asynchronously to the client; and
wherein communication between the debugging proxy and a native interface of the debugging component is synchronous.

* * * * *

UNITED STATES PATENT AND TRADEMARK OFFICE
CERTIFICATE OF CORRECTION

PATENT NO. : 7,530,053 B2  Page 1 of 2
APPLICATION NO. : 10/787702
DATED : May 5, 2009
INVENTOR(S) : William A. Pugh et al.

It is certified that error appears in the above-identified patent and that said Letters Patent is hereby corrected as shown below:

In column 13, line 53, delete "extend" and insert -- extends --, therefor.

In column 19, line 30, delete "wrapps" and insert -- wraps --, therefor.

In column 19, line 38, delete "recieving" and insert -- receiving --, therefor.

In column 19, line 41, delete "recieves" and insert -- receives --, therefor.

In column 19, line 43, delete "DeBugController" and insert -- DebugController --, therefor.

In column 19, line 47, delete "The" and insert -- This --, therefor.

In column 20, line 3, delete "The" and insert -- This --, therefor.

In column 20, line 12, delete "The" and insert -- This --, therefor.

In column 20, line 12, delete "wrapps" and insert -- wraps --, therefor.

In column 20, line 19, delete "colds" and insert -- holds --, therefor.

In column 20, line 23, delete "Knex" and insert -- KNEX --, therefor.

In column 20, line 33, above "SocketComm" insert -- ServerSocketCommAsync ServerSocketCommAsync is a class that will use a SocketComm for sending and receiving requests, but has another thread that is doing the actual sends/receives and queuing them to a buffer. --.

In column 20, line 40, delete "Exepction" and insert -- Exception --, therefor.

In column 21, line 58, delete "recive" and insert -- receive --, therefor.

In column 21, line 63, delete "recieve" and insert -- receive --, therefor.

Signed and Sealed this

First Day of June, 2010

David J. Kappos
*Director of the United States Patent and Trademark Office*

CERTIFICATE OF CORRECTION (continued)
U.S. Pat. No. 7,530,053 B2

In column 22, line 29, delete "recive" and insert -- receive --, therefor.

In column 22, line 43, delete "reciving" and insert -- receiving --, therefor.

In column 22, line 44, delete "recieves" and insert -- receives --, therefor.

In column 22, line 46, delete "socekt." and insert -- socket. --, therefor.

In column 22, line 54, delete "recive" and insert -- receive --, therefor.

In column 24, line 65, delete "default Port" and insert -- defaultPort --, therefor.

In column 26, line 18, after "Sockets" insert -- . --.

In column 27, line 10, delete "lanuguage" and insert -- language --, therefor.

In column 27, line 29, delete "IScritpValue" and insert -- IScriptValue --, therefor.

In column 27, line 42, delete "yeilds." and insert -- yields. --, therefor.

In column 30, line 45, delete "teh" and insert -- the --, therefor.

In column 31, line 29, delete "lanuguagy" and insert -- language --, therefor.

In column 31, line 38, delete "getPrimativeType()" and insert -- getPrimitiveType() --, therefor.

In column 33, line 1, delete "comlex" and insert -- complex --, therefor.

In column 33, line 18, delete "disect" and insert -- dissect --, therefor.

In column 35, line 12, delete "arguements" and insert -- arguments --, therefor.

In column 35, line 35, after "languages" insert -- . --.

In column 37, line 3, delete "set Method Breakpoint(" and insert -- setMethodBreakpoint( --, therefor.

In column 38, line 41, delete "DebugInteruptSocket" and insert -- DebugInterruptSocket --, therefor.

In column 40, line 29, delete "recievine" and insert -- receiving --, therefor.

In column 41, line 58, in claim 3, delete "it" and insert -- if --, therefor.